United States Patent Office 3,238,193
Patented Mar. 1, 1966

3,238,193
CROSS-LINKED STARCH ESTERS AND PROCESS
OF MAKING SAME
John V. Tuschhoff and Clifford E. Smith, Decatur, Ill.,
assignors to A. E. Staley Manufacturing Company,
Decatur, Ill., a corporation of Delaware
No Drawing. Filed Apr. 12, 1961, Ser. No. 102,365
16 Claims. (Cl. 260—233.5)

This application is a continuation-in-part of our co-pending application Serial No. 840,518 filed September 17, 1959, now United States Patent No. 3,069,410, which is a continuation-in-part of Serial No. 692,024 filed October 24, 1957, now abandoned; and Serial No. 792,972 filed February 13, 1959, now United States Patent No. 3,022,289, which is a continuation-in-part of Serial No. 661,032 filed 23, 1957, now abandoned and Serial No. 673,132, filed July 22, 1957, now United States Patent 2,928,828.

This invention relates to cross-linked starch acrylates having paste properties which make them particularly suitable for use as an ingredient in foods, such as pie fillings, to which the cross-linked starch acrylates impart body and consistency.

In the commercial production of fruit pies, the pie filling components (fruit, starch, sugar and water) are cooked together and then machine deposited into a previously prepared pie crust. The pie is either baked shortly thereafter or else frozen prior to distribution to the public.

The starch used in fruit pie fillings must have the following characteristics: (1) It must be capable of being cooked with other ingredients of the pie filling to form a paste, which, when hot, will have sufficient consistency or viscosity so that it will support the fruit. In other words the starch paste must keep the fruit from settling to the bottom of the pie. The word "cooked" is used in this application to mean prolonged heating above the pasting temperature of the starch. While the starch is pasted during this operation, the word "cooked" is not used synonymously with the word "pasted." (2) The cooked filling, on cooling, must thicken to a consistency which is neither watery nor too stiff. (3) The gel must be transparent, clear and brilliant and not cloudy. (4) The gel must be short and not stringy, but it must not be so short as to be crumbly. (5) It should cleave easily without crumbling. (6) In those cases where the pie is to be frozen the starch must be freeze-thaw resistant. A starch is freeze-thaw resistant when material amounts of water are not synerized from the starch during thawing. When the starch is not freeze-thaw resistant, the pie filling is frequently watery after it is defrosed and especially after baking.

Starches may be classified into two broad classes, one class comprising common cereal starches (corn, rice, wheat, for example) and the other class comprising root or root-type starches (potato, waxy maize, waxy sorghum, cassava, for example). For the purpose of this application "root-type" includes root and root-type starches. When root or root-type starches are cooked in water and then cooled, starch pastes are formed which are more viscous and more stable in viscosity than cereal starch pastes which have been prepared in the same way. When the root-type starch paste is cooled to room temperature, the starch paste retains its viscous character, clarity and texture to a far greater degree than a cereal starch paste which has been treated in the same manner. The cereal starch paste usually forms an opaque gel on cooling. The difference in the paste viscosity characteristics of root and root-type starches on the one hand and of cereal starches on the other hand is particularly pronounced when the starch is pasted and cooked at a pH less than 5 with the other ingredients of a food product, as in the baking industry in the preparation of fruit pie fillings. The pH at which the starch is pasted and cooked is dependent on the acidity of the fruit and/or the tart acid flavorings, which are present during the cooking. The acid pH causes the paste viscosity of cereal starches to exhibit still greater instability. Accordingly, root and root-type starches are used in pie fillings, etc., in preference to cereal starches even though the root and root-type starches are frequently more expensive than the readily available cereal starches.

We are aware that cross-linking agent, such as epihalohydrins, acetaldehyde, ethylene dichloride, acrolein, dimethylol urea, etc., have been used to prepare starch derivatives at a low degree of substitution which have a higher paste viscosity than unmodified starch. See, for example, United States Patent 2,853,484 to Lolkema et al., "The Chemistry and Industry of Starch," Second Edition (1950) by Kerr, page 470 and Serial No. 840,158, filed September 17, 1959, now United States Patent 3,069,-410, which is a continuation-in-part of Serial No. 692,024, filed October 24, 1957, now abandoned. However, on cooling to room temperature, cereal starch pastes, even though reacted as described, tend to form stiff, opaque gels which are unsuitable for use in pie fillings. Further, as the degree of substitution of the cross-linked starch increases, the starch becomes inhibited to pasting. Since the starch is unable to paste properly, the viscosity of the cooked starch paste as well as the viscosity of the cooled starch paste is too low for use in pie fillings. When the viscosity of the cooled starch paste is too low, the starch paste fails to give the baked pie filling the necessary body. It must be emphasized that merely increasing the viscosity of cereal starch pastes is of little value unless the paste viscosity of the starch is stable.

We are also aware that United States Patent 2,461,139 to Caldwell discloses that certain anhydrides can be used to prepare starch acylates. However, when a cereal starch acylate is cooked at a pH less than 5, which is one of the standard conditions used in the baking industry to prepare starch pastes for pie fillings and/or tarts, etc., the starch paste becomes thin and watery and therefore fails to give the pie filling sufficient body. As stated previously, the pH at which the starch is cooked is dependent on the acidity of the fruit and/or tart acid flavorings, which are present during the cooking.

The object of this invention is to prepare cereal starch derivatives suitable for food uses, such as pie fillings, whose hot, cooked pastes are more viscous and more stable in viscosity than unmodified cereal starch pastes and whose cooled pastes have good clarity, short texture and are noncongealing.

Another object of this invention is to prepare cross-linked starch acylates having improved freeze-thaw properties.

In one aspect this invention is a cross-linked cereal starch acylate of a monocarboxylic acid having an alkaline fluidity of between 50 cc. and 90 cc.

In a second aspect this invention is a process of preparing a cross-linked cereal starch acylate of a mono-carboxylic acid, which comprises reacting a cereal starch with a cross-linking agent until the cross-linked starch has an alkaline fluidity of between 50 cc. and 90 cc. and then acylating said cross-linked starch with a vinyl ester of a monocarboxylic acid or an anhydride of a monocarboxylic acid.

In a third aspect this invention is a process of preparing a cross-linked cereal starch acylate of a monocarboxylic acid, which comprises reacting a cereal starch with a cross-linking agent until the cross-linked starch has an alkaline fluidity of between about 40 cc. and 60 cc., acylating said cross-linked cereal starch with a vinyl ester of a monocarboxylic acid at an alkaline pH to generate acetaldehyde in situ and then cross-linking said cereal starch until its alkaline fluidity is between 60 cc. and 90 cc. with the acetaldehyde generated during the acylation step by lowering the pH of the reaction mixture below 4.

In a fourth aspect this invention is a process of preparing a cross-linked cereal starch acylate of a monocarboxylic acid, which comprises acylating said cereal starch with a vinyl ester of a monocarboxylic acid or an anhydride and then reacting said starch with a cross-linking agent until said starch has an alkaline fluidity of from 50 cc. to 90 cc.

We have attained the foregoing objects by preparing certain cross-linked starch acylates. These cross-linked starch acylates are prepared by reacting granular starch with a monofunctional acylating agent and a polyfunctional cross-linking agent. However, not all cross-linked starch acylates have the paste properties necessary for use in fruit pie starches. The cross-linked cereal starch acylates of this invention have an alkaline fluidity of from about 50 cc. to 90 cc. Inasmuch as the test used to measure the alkaline fluidity of the cross-linked starch acylates is described in some detail below, it is sufficient for the purpose of understanding this invention to realize at this point that the alkaline fluidity of the cross-linked starch acylate is a measurement of the viscosity of the cross-linked starch having essentially no monofunctional acylate groups. In other words, the alkaline fluidity is purely a measurement of the viscosity of the cross-linked starch. The monoacylate groups are apparently saponified during the alkaline fluidity test. If the alkaline fluidity of the cross-linked cereal starch is below 50 cc., the baked pie filling is watery and runs. In effect, the starch granule has not been toughened sufficiently to resist the acid pH. On the other hand, if the alkaline fluidity of the cross-linked cereal starch is above 90 cc., the starch is inhibited to such an extent that the fruit settles out of the pie filling prior to baking. In both cases, the starch paste is unsatisfactory since it fails to give the pie filling the necessary body.

The acyl groups of the cross-linked cereal starch acylates not only give the pie starch improved clarity, texture and freeze-thaw resistance, but also lower the pasting temperature of the starch. In the absence of these acyl groups, cross-linked cereal starches having an alkaline fluidity of from 50 cc. to 90 cc. may be too inhibited to paste properly. Accordingly, the pie filling lacks the necessary machine depositing characteristics and the baked pie is watery. In effect the acyl groups give the pie starch the high initial viscosity, which is necessary in machine depositing, while the cross-linking agents toughen up the granule. Accordingly, the cross-linking step and acylation step are both necessary in order to get a pie starch having the necessary paste characteristics.

The alkaline fluidity test is a convenient method for controlling the extent to which a starch is being cross-linked. However, cereal starch often varies in its paste properties depending, for example, on the time the cereal grain is harvested, and this affects the properties of the starch derivatives made from it. Because of this variability in the parent starch, some cross-linked starch acylates falling within the prescribed alkaline fluidity range may be too inhibited or not toughened sufficiently for use in fruit pie fillings. While the alkaline fluidity test is a means for arriving at a desirable product, the final product should, for fruit pie use, have a paste viscosity at pH 3.5 of at least 700 gm.-cm. after 15 minutes and of at least 600 gm.-cm. after 40 minutes at 201° F., as measured on a Corn Industries Research Foundation viscometer. (The details of this test, referred to as the "CIV test," are described below). Preferably the cross-linked starch acylates should have a 15 minute paste viscosity of at least 740 gm.-cm. and a 40 minute paste viscosity of at least 680 gm.-cm. If the cross-linked starch acylate has a 15 minute paste viscosity of less than 700 gm.-cm. it is too inhibited for use in fruit pies, while if the 15 minute paste viscosity is more than 700 gm.-cm. but the 40 minute paste viscosity is less than 600 gm.-cm., the starch granule has not been toughened sufficiently. However, normally the alkaline fluidity standard is sufficient to determine when the desired product has been obtained even though it is not the sole criterion.

Those products, which are not sufficiently toughened (i.e. the 40 minute CIV at 201° F. is less than 600 gm.-cm.) can be used advantageously for cream pie fillings while those products which are inhibited (i.e. the 15 minute CIV at 201° F. is less than 700 gm.-cm.) can be used as thickeners for alkaline printing inks.

The preferred starches of this invention are the unmodified common-variety cereal starches, such as corn starch, wheat starch, rye starch, rice starch, etc. Various modified starches may also be used in this invention. However, modified starches, such as those which have been oxidized according to United States Patent 2,108,862 to Kerr, have a lower viscosity after cross-linking and acylation than the unmodified cross-linked cereal starch acylates. This is particularly surprising since the modified starches of Kerr prior to acylation and cross-linking have a higher viscosity than the unmodified native starch.

The polyfunctional cross-linking agents of this invention are etherifying agents and esterifying agents having at least two functional groups that react with hydroxyl groups of the starch. The term "polyfunctional cross-linking agent" refers to compounds having at least two groups capable of reacting with the hydroxyl groups of starch, such as, aldehyde groups, ethylenically unsaturated groups, epoxy groups, halo groups, keto groups, etc. Starches cross-linked with monofunctional cross-linking agents, such as acetaldehyde, are subject to partial hydrolysis when cooked for extended periods at an acid pH. The following are representative of the polyfunctional cross-linking agents, which can be used in this invention: ethylenically unsaturated aldehydes, such as acrolein and crotonaldehyde; dihaloalkanes, such as ethylene dichloride, 1,2-propylene dibromide, 2,6-hexylene dichloride; dialdehydes, such as glyoxal and adipaldehyde; methylol compounds, such as dimethylol urea; epihaloalkanes, such as epichlorohydrins, 1,2-epoxy-4-chlorobutane and 1,2-epoxy-5-bromopentane; polybasic acid halides, such as phosphorous oxychloride and adipyl chloride; etc. These etherifying and esterifying agents can be used in an amount equal to from about 0.01% to 10% by weight of dry starch. Although the amount of cross-linking reagent added to the starch is not particularly critical so long as the product has the proper alkaline fluidity, it is economically desirable to use as low a concentration of cross-linking reagent as possible. Furthermore, it is important that the reaction of the cross-linking agent with starch be capable of easy control. It is still more important that the cross-linked starch acylate have a relatively constant viscosity during the cooking of the starch under acid conditions. Phosphorous oxychloride, acrolein and epichlorohydrin are our preferred cross-linking agents, which fulfill all of the above requirements. For example, acrolein is preferably used in a concentration of 0.10% to 0.30% by weight of the dry starch, epichlorohydrin is preferably used in a concentration of from 0.01% to 0.30% and phosphorous oxychloride is preferably used in a concentration of from 0.01% to 0.30%. It is rarely economically advisable to use more than 1% by weight of these cross-linking agents. Furthermore, the more cross-linking agent used, the harder it is to control the extent of cross-linking. The reaction of the phosphorous oxychloride and epichlorohydrin can be terminated or essentially curtailed by adjusting the pH of the alkaline reaction mixture, while the acrolein reaction can be terminated by adding sodium bisulfite to the reaction mixture. It must be emphasized that if more than the recommended amount of the preferred cross-linking agents is used with an alkaline catalyst, such as NaOH, and the reaction is allowed to go to completion without regard to the alkaline fluidity of the cross-linked starch, the cross-linked starch will be too inhibited for use in a pie filling. Even the recommended amounts of the preferred cross-linking agents will in most cases cause the starch to become inhibited when the cross-linking reaction is permitted to go to completion without regard to the alkaline fluidity of the cross-linked starch. Accordingly, the alkaline fluidity of the cross-linked starch must be controlled carefully, and thereby the desired extent of reaction is obtained.

Representative of the monofunctional acylating agents which may be used in this invention are vinyl esters of monocarboxylic aliphatic acids having up to 18 carbon atoms, such as vinyl acetate, vinyl hexoate and vinyl stearate, and anhydrides of aliphatic monocarboxylic acids, such as acetic anhydride and propionic anhydride. The vinyl esters are the preferred acylating agents of this invention since their reaction with starch is more efficient than the reaction of the anhydrides with starch.

Besides their efficiency, the vinyl esters generate acetaldehyde in situ during the course of the alkaline acylation reaction, and this can be used to cross-link the starch at a pH below about 4. This unique cross-linking reaction is the subject of our application Serial No. 102,371, filed on even date with this application, now U.S. Patent 3,081,296. The acetaldehyde, which is formed in situ, can be advantageously used as an auxiliary cross-linking agent. When this in situ generated acetaldehyde is used as an auxiliary cross-linking agent with any of the preferred cross-linking agents (acrolein, phosphorous oxychloride and epichlorohydrin), the cooked paste of the product has a higher peak viscosity than a starch cross-linked only with acrolein or phosphorus oxychloride or epichlorohydrin. A high peak viscosity usually indicates that the pie filling starch has good machine depositing characteristics. It is to be noted that no acetaldehyde is generated by the vinyl ester except at the alkaline pH necessary for the acylation reaction.

Vinyl acetate and vinyl propionate are the preferred vinyl esters since they esterify starch very rapidly. The higher esters, such as vinyl butyrate and vinyl 2-ethylhexoate, are not as reactive as vinyl acetate and vinyl propionate, while vinyl formate forms a starch ester which is somewhat unstable. The various monofunctional acylating agents of this invention can be used in an amount equal to from about 1.0% to 40% by weight of the dry unmodified starch in order to prepare starch acylates having from about 0.2% to 10% by weight acyl groups; however, the efficiency of reaction, as noted before, varies with the particular acylating agent.

The higher proportion of acylating agent is usually necessary when the starch is acylated prior to being cross-linked at a relatively high alkaline pH. These conditions promote the saponification of the acyl groups. When cross-linked starch acetates and propionates are prepared, the acyl groups are preferably present in an amount equal to from 1.5% to 3.5% by weight of the starch. A higher weight percent of acyl groups only increases the cost of the product, without materially effecting its properties.

Any polar solvent, such as water, lower alcohols, dioxane, etc., can be used as the dispersing medium for the granular starch. While polar organic solvents, such as ethanol prevent the starch from pasting during its reactions with acylating agents and cross-linking agents at any concentration of alkali, water is the preferred medium because of its low cost.

In accordance with this invention, the starch etherification or esterification catalysts, that can be used include sodium hydroxide, potassium hydroxide, calcium hydroxide, barium, hydroxide, ammonium hydroxide, sodium carbonate, trisodium phosphate, tetramethyl ammonium hydroxide, etc. The above compounds are representative of the alkali metal hydroxides, alkali metal salts of weak acids, quaternary ammonium hydroxides, and alkaline earth hydroxides.

While the processes employed to prepare the cross-linked starch acylates of this invention are susceptible of various modifications, these processes fall into three distinct types. In the first type, granular cereal starch is cross-linked with a polyfunctional cross-linking agent to an alkaline fluidity of 50 cc. to 90 cc. and then it is treated with a monofunctional acylating agent. In the second type, a granular cereal starch is cross-linked to an alkaline fluidity of from 40 cc. to 60 cc., acylated with a vinyl ester and then cross-linked with the acetaldehyde generated during the vinyl ester acylation to an alkaline fluidity of from 60 cc. to 90 cc. In the third type, the granular cereal starch is acylated and then cross-linked with a polyfunctional cross-linking agent to an alkaline fluidity of 50 cc. to 90 cc. If a vinyl ester is used as the acylating agent, the acetaldehyde generated during the acylating reaction may be used to partially cross-link the starch prior to the addition of the polyfunctional cross-linking agent. Generally, we prefer to carry out the cross-linking step prior to the acylation step since at the strongly alkaline pH's, which are preferred in the use of the preferred cross-linking agents, there is a tendency to saponify off some acylate groups.

In somewhat greater detail, granular starch is suspended in a polar solvent in such a manner that the starch comprises from 2–70% by weight of the composition and then an alkaline catalyst is added. Alternatively, the granular starch may be suspended in a polar solvent containing the alkaline catalyst. The cross-linking reaction is usually carried out at a pH of from about 9–13 with the preferred cross-linking agents, and sufficient alkali is used to establish this pH. Then the cross-linking agent is added. During the cross-linking reaction, the alkaline fluidity of the starch decreases to a minimum and then increases as the cross-linking toughens up the starch molecule. After the cross-linked starch has the desired alkaline fluidity, the reaction can be terminated by adding a strong mineral acid, such as hydrochloric acid or sulfuric acid, to lower the pH below 9. The cross-linked starch can then be washed in order to remove residual cross-linking agent. However, when cross-linking agents that require a highly alkaline medium for cross-linking are used, such as $POCl_3$, the pH of the reaction mixture drops rapidly on the addition of the acylating agent and the cross-linking reaction is thereby arrested without the addition of acid.

When acrolein is used as the cross-linking agent, the cross-linking reaction may be carried out at an alkaline pH, however, the cross-linking reactions is more rapid at a pH of from about 9–12. The acrolein cross-linking reaction, which cannot be controlled solely by changing the pH of the reaction, is terminated by adding a soluble bisulphite, such as sodium bisulphite, in an amount sufficient to react with any unused acrolein. Usually an amount equal to from about 1/10 to about twice the weight of the acrolein initially added to the reaction mixture is sufficient. The bisulphite termination of the acrolein cross-linking reaction lends additional flexibility to the use of acrolein since the degree of cross-linking can be modified in two ways. If the alkaline fluidity is too high, excess bisulphite is added to the reaction mixture, and the alkaline fluidity of the starch is decreased. On the other hand, if the alkaline fluidity is too low after the bisulphite addition, the cross-linking reaction can be initiated again by increasing the pH above about 11; the acrolein in the reaction mixture then continues to cross-link the product to increase the alkaline fluidity to the desired value.

Polyfunctional cross-linking agents similar to dimethylol urea can be employed at an acid pH in the manner described by Gill et al. in United States Patent 2,407,071.

The acylation reaction can be carried out at a pH of from about 7.0–12.5. The preferred pH range for the vinyl ester acylation is from about 8–10 while the anhydride acylation is preferably carried out at a pH of from around 7–10.

The acylation rate of the preferred vinyl esters is moderately rapid over the temperature range of 75° F. to 115° F. For example, the reaction between a starch suspension and vinyl acetate is essentially complete in as little as 10 minutes at 100° F. Useful, but slower, reaction rates are obtainable at temperatures as low as 35° F.–40° F. Higher temperatures increase the rate of reaction, and the temperature is limited only by the pasting temperature of the starch. On the other hand, the anhydrides are preferably used over the temperature range of 65° F. to 115° F. At lower temperatures, the rate of reaction is slower, while at the higher temperatures the anhydride tends to hydrolyze before it can react with the starch.

The cross-linking of granular acylated starch with the acetaldehyde generated during the vinyl ester acylation step is carried out by lowering the pH of the reaction mixture to below 4 (usually about 3.5) while maintaining the starch suspension at a temperature in the acylation temperature range. At this pH, the acetaldehyde cross-links the starch. The reaction mixture is maintained at a pH below 4 until the cross-linked starch has the desired alkaline fluidity. The cross-linking is then terminated by raising the pH to above 5.

The cross-linked starch acylates, which are still in a granular form, are separated from the final reaction mixture (acetaldehyde-cross-linking reaction or polyfunctional cross-linking reaction or monofunctional acylation reaction) by, for example, filtration or centrifugation. The granular cross-linked starch acylate is then readily washed free of all impurities.

The examples following are merely illustrative and should not be construed as limiting the scope of the invention.

The alkaline fluidity test referred to in the examples that follow is performed in this manner. The concentration of the alkaline starch dispersion prior to the addition of the vinyl ester is determined, for example, by measuring the density in degrees Baumé. The exact quantity of slurry which contains 2.0 grams of starch (dry solids basis) is calculated from the concentration. Ten minutees after the cross-linking reaction is initiated, the appropriate volume of starch slurry (containing 2.0 grams starch) is placed in a 400 ml. fluidity beaker. The starch slurry is then diluted to approximately 100 ml. with an aqueous solution containing 0.95 grams of NaOH (e.g., 50 ml. 0.475 N NaOH plus sufficient water to dilute to 100 ml.). In other words the suspension (approximately 100 cc.) always contains 2.0 grams of starch and 0.95 grams of NaOH. When the starch comprises from about 45–50% by weight of the reaction mixtures, which is the preferred aqueous starch concentration, 95 ml. of 0.25 N NaOH can be used to dilute the starch suspension to approximately 100 cc. The starch suspension is stirred at between 450 and 460 r.p.m. for three minutes in order to paste the starch. The resulting starch solution is poured into a standard fluidity funnel having a specific water-time between about 30 and 40 seconds. The "water-time" is the exact number of seconds it takes for 100 cc. of water to flow through the funnel. The number of cc. of starch solution, which flows through the funnel in the water-time, is the alkaline fluidity of the starch. The extent of cross-linking of the starch is followed by repeating this until the alkaline fluidity of the starch paste reaches the desired level.

The CIV cooking test used in the following examples approximates the conditions employed in the preparation of fruit pie fillings. This test comprises suspending 60 grams of cross-linked starch acylate in 1100 grams of a 35 percent (by weight) aqueous solution of sucrose and then lowering the pH of the suspension to 3.5 with citric acid. The suspension is then placed in a Corn Industries Research Foundation Viscometer equipped with a heating jacket which is maintained at 201° F. The viscosity is recorded at its peak and at 10, 15 and 40 minutes after the suspension has been placed in the viscometer.

EXAMPLE I

Thirty grams of sodium carbonate in an 8% by weight aqueous solution was added to 1,000 grams of corn starch (dry solids basis) suspended in 1,150 ml. of water. After the alkaline starch suspension, pH 10.2) was heated to 100° F., 2 grams of acrolein was added to the stirred starch suspension. The alkaline fluidity of the starch suspension reached 71 cc. in 1 hour and 20 minutes. Four grams of sodium bisulphite was then added to terminate the cross-linking reaction. After mixing for ten minutes, 70 grams of vinyl acetate was added to the suspension of cross-linked starch. After 45 minutes, the reaction was terminated by adjusting the pH to 6 with aqueous HCl. The cross-linked starch acylate was then filtered, washed with water and then reslurried in 1000 ml. of water. After the pH was again adjusted to 6 with HCl, the cross-linked starch acylate was filtered, washed with water and then dried to a 12% by weight moisture content.

The starch, on a dry solids basis, had an acetyl content of 2.6% by weight. The CIV data on this sample is set forth in Table I.

EXAMPLE II

Example I was repeated except that the sodium bisulphite was added to the reaction mixture after the cross-linked starch had an alkaline fluidity of 68 cc.

EXAMPLE III

Example I was repeated except that the sodium bisulphite was added to the reaction mixture after the cross-linked starch had an alkaline fluidity of 74.5 cc.

EXAMPLE IV

Example I was repeated except that the sodium bisulphite was added to the reaction mixture after the cross-linked starch had an alkaline fluidity of 55 cc.

EXAMPLE V

Example I was repeated except that the sodium bisulphite was added to the reaction mixture after the cross-linked starch had an alkaline fluidity of 63 cc.

*Table 1*

| Starting Starch | Percent Acetyl By Weight On Dry Solids Basis | Pasting Temp., °F. | Alkaline Fluidity, cc. | Viscosity In gm.-cm. | | | |
|---|---|---|---|---|---|---|---|
| | | | | 10 Min. | 15 Min. | Peak | 40 Min. |
| Unmodified Corn Starch | 0 | 184 | 36 | 173 | 175 | 177 | 157 |
| Example I | 2.6 | 177 | 71 | 792 | 880 | 880 | 744 |
| Example II | 2.8 | 179 | 68 | 736 | 856 | 864 | 768 |
| Example III | 2.6 | 178 | 74.5 | 776 | 880 | 880 | 776 |
| Example IV | 2.3 | 180 | 55 | 704 | 840 | 840 | 720 |
| Example V | 2.3 | 180 | 63 | 672 | 760 | 760 | 696 |

The above table indicates that the viscosity of the acrolein cross-linked starch acylate pastes of this invention is substantially higher than unmodified corn starch pastes. On cooling, the unmodified corn starch formed an opaque gel while the other five samples were clear and noncongealing. This indicated that the cross-linked starch acylates were quite suitable for use in pie fillings.

EXAMPLE VI

This example illustrates the use of acetaldehyde, which had been generated during the vinyl ester acylation step, as an auxiliary cross-linking agent. Thirty grams of $Na_3PO_4 \cdot 12H_2O$ was added to 1000 grams of corn starch (dry solids basis) dispersed in 1150 ml. of water. After the alkaline suspension had been heated to 100° F., 2 grams of acrolein was added to the stirred starch suspension. Thirty-five minutes later, the starch had an alkaline fluidity of 50 cc. and 4 grams of sodium bisulfite was added to terminate the cross-linking reaction. Seventy grams of vinyl acetate was then added to the reaction mixture. After two hours, the pH was lowered to 2.9 in order to carry out the acetaldehyde cross-linking. During the course of 1 hour, the alkaline fluidity increased to 85 cc. and the acetaldehyde cross-linking was terminated by adjusting the pH of the reacticon mixture to 5.5. The starch was filtered, washed, reslurried, filtered, washed and dried as in Example I. The CIV data on this sample is recorded in Table II.

EXAMPLE VII

Example VI was repeated except that 30 grams of sodium carbonate was used in place of the $Na_3PO_4 \cdot 12H_2O$ and 2.5 grams of acrolein was added in increments of 1.5 grams, 0.5 gram, and 0.5 gram over a period of three and one-half hours. The acrolein cross-linking was terminated when the cross-linked starch had an alkaline fluidity of 41 cc., and the acetaldehyde cross-linking was terminated when the cross-linked starch acylate had an alkaline fluidity of 83.5 cc.

EXAMPLE VIII

This example illustrates the preparation of a $POCl_3$ cross-linked starch acylate. Thirty grams of sodium carbonate in an 8% by weight aqueous solution was added to 1000 grams of corn starch (dry solids basis) dispersed in 1200 ml. of water. After the alkaline starch suspension had been heated to 100° F., 1.39 grams $POCl_3$ (0.75 ml.) was added to the stirred suspension. The alkaline fluidity of the starch suspension reached 70.5 cc. in 2 hours. With the addition of 75 grams of vinyl acetate, the pH of the reaction mixture rapidly dropped from 10.2 to about 8, thereby terminating the $POCl_3$ reaction. After one hour, the vinyl acetate reaction was terminated by adjusting the pH to 5.5 with HCl. The product was filtered, washed, reslurried, filtered, washed and dried as in Example I. The CIV data on this sample is recorded in Table III.

EXAMPLE IX

Example VIII was repeated except that the $POCl_3$ was added in three equal increments of 0.25 ml. at intervals of two hours. The vinyl acetate was added six hours after the first increment of $POCl_3$ was added, when the cross-linked starch had an alkaline fluidity of 71.5 cc.

EXAMPLE X

This example illustrates the rapidity of the $POCl_3$ reaction when a more alkaline catalyst system is used. Example VIII was repeated except that 7 grams of sodium hydroxide was used in addition to the 30 grams of $NaCO_3$ in Example VIII and 0.33 gram (0.18 ml.) of $POCl_3$ was used in place of the 1.39 grams of $POCl_3$ in Example VIII. The vinyl acetate was added twenty minutes after the $POCl_3$ reaction commenced, when the cross-linked starch had an alkaline fluidity of 84 cc.

*Table III*

| Starting point | Percent Acetyl As Is | Pasting Temp., ° F. | Alkaline Fluidity, cc. | Viscosity In gm.-cm. | | | |
|---|---|---|---|---|---|---|---|
| | | | | 10 Min. | 15 Min. | Peak | 40 Min. |
| Unmodified Corn Starch | 0 | 184 | 36 | 173 | 175 | 177 | 157 |
| Example VIII | 2.49 | 177 | 70.5 | 816 | 832 | 840 | 728 |
| Example IX | 2.55 | 176 | 71.5 | 880 | 888 | 900 | 720 |
| Example X | 1.85 | 177 | 84 | 816 | 816 | 816 | 712 |

The above table indicates that the viscosity of the $POCl_3$ cross-linked starch acylate pastes of this invention are considerably higher than the unmodified corn pastes. On cooling, the cross-linked starch acylate pastes were clear and noncongealing.

*Table II*

| Starting Starch | Percent Acetyl By Weight As Is | Pasting Temp. ° F. | Alkaline Fluidity, cc. | Viscosity In gm.-cm. | | | |
|---|---|---|---|---|---|---|---|
| | | | | 10 Min. | 15 Min. | Peak | 40 Min. |
| Unmodified Corn Starch | 0 | 184 | 36 | 173 | 175 | 177 | 157 |
| Acrolein Cross-Linked Starch Example I | 2.3 | 177 | 71 | 792 | 880 | 880 | 744 |
| Acrolein-Acetaldehyde Cross-Linked Starch Example VI | 1.85 | 182 | 85 | 616 | 888 | 936 | 872 |
| Acrolein-Acetaldehyde Cross-Linked Starch Example VII | 2.15 | 178 | 83.5 | 664 | 856 | 888 | 824 |

The above table shows that the acrolein-acetaldehyde cross-linked corn starch acylate pastes have as good as or better viscosity characteristics on cooking as do the acrolein cross-linked corn starch acylates. On cooling, the cross-linked starch acylate pastes were clear and noncongealing.

EXAMPLE XI

This example illustrates the effect of acid oxidation of corn starch (according to the method of Kerr Patent 2,108,862) prior to the addition of $POCl_3$. One thousand grams corn starch (dry solids basis) which was dispersed in 1200 ml. of water was adjusted to pH 4 with HCl. The slurry was then treated with 69 ml. (8 grams $Cl_2$) of 4.1 titre bleach. The slurry was readjusted to pH 4 and held there for 1 hours. The slurry was then treated with about 1 gram sodium bisulphite to dissipate the remaining chlorine. The slurry was then divided into two equal parts. The pH of one part (A) was adjusted to 5 with NaOH. It was then filtered, and the product was washed with water, reslurried in 600 ml. of water, filtered and washed with water and then dried.

The second part (B) was treated with 3.5 grams NaOH and 15 grams of $NaCO_3$ giving the sample a pH of 10.6. The pH of the sample was adjusted to 11.0 with NaOH. The slurry was then treated with 0.165 gram $POCl_3$ (0.09 ml.) and allowed to react at 100° F. for 30 minutes. Thirty-five grams of vinyl acetate was then added. After 45 minutes, the pH was adjusted to 5.5. The slurry was filtered, and the filter cake was washed with water, reslurried in water, and again filtered, washed with water and then dried. The results of the CIV test are listed below in Table IV.

*Table IV*

| Starting Starch | $Cl_2$ Treatment, percent | Pasting Temp., °F. | Viscosity In gm.-cm. | | | |
|---|---|---|---|---|---|---|
| | | | 10 Min. | 15 Min. | Peak | 40 Min. |
| Example XI A Not Cross-Linked | 0.8 | 171 | 200 | 218 | 219 | 202 |
| Example XI B Cross-Linked | 0.8 | 176 | 560 | 576 | 584 | 496 |
| Example VIII | 0.0 | 177 | 816 | 832 | 840 | 728 |

The above table indicates that while cross-linking and acylating oxidized starches increases the paste viscosity of oxidized starches, oxidation lowers the paste viscosity of cross-linked starch acylates when the oxidized cross-linked cereal starch acylates are compared with unmodified cross-linked starch acylates.

EXAMPLE XII

This example illustrates the use of acetic anhydride as the monoacylating agent and also the cross-linking of starch which has been acylated first. Two hundred grams of acetic anhydride and sufficient 3% NaOH was added over a period of 70 minutes to one thousand grams of corn starch dispersed in 1200 ml. of water to keep the slurry at a pH between 9 and 10. Thirty minutes later, 20 grams of acrolein was added to the slurry. Three hours later, the sample was filtered, washed with water, reslurried with water, filtered, washed with water and dried.

EXAMPLE XIII

This example illustrates the preparation of rice starch cross-linked with epichlorohydrin and acetylated with acetic anhydride. Three grams of NaOH, which was dissolved in 100 ml. of water, was added to 410 grams of rice starch dispersed in 500 ml. water. After the temperature of the reaction mixture was adjusted to 100° F., 1.8 grams of epichlorohydrin was added to the suspension over a period of four hours. Sixty cc. of acetic anhydride was added to the starch suspension when the alkaline fluidity reached 74 cc. After 1½ hours the pH was adjusted to 6 and the cross-linked starch acylate was isolated by the method employed in Example I. The 40 minute CIV viscosity of the sample was 720 gm.-cm. The product had 3.30% acetyl on a dry solids basis.

EXAMPLE XIV

This example illustrates the use of vinyl propionate as the acylating agent and also the cross-linking of starch following the acylation step. Eighty cc. of vinyl propionate and 17.5 grams of sodium carbonate were added to 1000 ml. of a 22.9 Bé. corn starch suspension. After one hour at 115° F., the pH of the reaction mixture was adjusted to pH 9.5 with $Na_2CO_3$ and one gram of acrolein was added. The pH was then adjusted to 10.1 with NaOH. When the alkaline fluidity of the product reached 75 cc., two grams of sodium bisulphite was added to the suspension in order to terminate the cross-linking reaction. The product was isolated by the method of Example I. The product had 1.6% propionyl groups on a dry solids basis, a 15 minute CIV viscosity of 750 and a 40 minute CIV viscosity of 708 gm.-cm.

EXAMPLE XV

This example illustrates the use of epichlorohydrin to cross-link corn starch. Seven grams of NaOH was added to 1,000 grams of corn starch (dry solids basis) dispersed in 1,150 ml. of water. After the alkaline suspension had been heated to 100° F., 1.25 grams of epichlorohydrin was added to the starch suspension. When the alkaline fluidity of the sample reached 80 cc., the sample was neutralized with dilute $H_2SO_4$, filtered and the filter cake washed with water. Thirty grams of NaOH and 70 grams of vinyl acetate were added to the cross-linked starch which had been re-dispersed in 1,150 ml. of water. After one-half hour at 110° F., the slurry was adjusted to pH 6 with dilute $H_2SO_4$. The sample was filtered, washed with water, re-dispersed in water, filtered, washed with water again and then dried. The product had a 15 minute CIV viscosity of 840 gm.-cm. and a 40-minute CIV viscosity of 600 gm.-cm.

EXAMPLE XVI

This example illustrates the preparation of a cross-linked hydroxy-propyl corn starch. Ten grams of NaOH and 77 grams of NaCl dissolved in 200 ml. of water were added with stirring to 1,000 grams of corn starch suspended in 1150 ml. water. Fifty grams of propylene oxide was added under the surface of the slurry. After the slurry had been mainained at 115° F. for 24 hours, it was neutralized with aqueous HCl and filtered, and the separated hydroxypropyl starch was washed with water and re-suspended in 1150 ml. water. Thirty grams of sodium phosphate and 1.5 grams of acrolein were added to the hydroxypropyl starch suspension, and it was maintained at 115° F. for 40 minutes. At this point the sample had an alkaline fluidity of 50.5 cc. and 3 grams of sodium bisulphite was added. The cross-linked hydroxypropyl starch ssuspension was adjusted to pH 7 with HCl, filtered, washed with water, redispersed in one liter of water, filtered, washed with water and then dried. The product had 1.8% by weight hydroxypropyl. A CIV test was run on this sample and the data is recorded in Table V.

EXAMPLE XVII

Example XVII was repeated except that 30 grams of propylene oxide was used, 2.1 grams of acrolein was used, and the cross-linking was terminated when the product had an alkaline fluidity of 72.5 cc. The hydroxypropyl cross-linked starch had 1.2% by weight hydroxypropyl.

Table V

| Starting Starch | Percent Hydroxy-propyl | Pasting Temp., °F. | Alkaline Fluidity, cc. | Viscosity In gm.-cm. | | | |
|---|---|---|---|---|---|---|---|
| | | | | 10 Min. | 15 Min. | Peak | 40 Min. |
| Unmodified Common Corn | 0 | 184 | 36 | 173 | 175 | 177 | 157 |
| Example XVI | 1.8 | 175 | 50.5 | 760 | 752 | 760 | 680 |
| Example XVII | 1.2 | 181 | 72.5 | 640 | 720 | 728 | 704 |

EXAMPLE XVIII

This example illustrates the improved freeze-thaw properties of the cross-linked starch acylates of this invention. The following conditions were the same throughout. Six grams of granular starch was pasted in 144 ml. of water in the presence of sufficient citric acid to give a pH of 3.5. The starch paste was then cooked in a steam kettle at 20 pounds pressure until the mixture boiled for about 30 seconds. The starch paste was then poured into three 40-ml. centrifuge tubes up to the 40 ml. mark. The centrifuge tubes were cooled and then frozen at −8° F. overnight. All of the centrifuge tubes were thawed to room temperature and then heated in a steam bath for five minutes. One tube was centrifuged and the number of ml. of water, which had separated from the paste was noted. The other tubes were cooled to room temperature and then frozen a second time. The thawing and freezing was repeated through three cycles. The results are recorded in Table VI below.

Table VI

| Starch | Number of cc. That Separated In Each Cycle | | |
|---|---|---|---|
| | 1st Cycle | 2nd Cycle | 3rd Cycle |
| Unmodified Corn Starch | 16 | 20 | 24 |
| Cleargel* Starch | 6 | 8 | 7 |
| Acrolein Cross-Linked Starch Acetate of Example II | 0.5 | 0.5 | 1 |
| Acrolein-Acetaldehyde Cross-Linked Starch Acetate of Example VII | 0 | 0 | 0.5 |
| Phosphorous Oxychloride Cross-Linked Starch Acetate of Example IX | 0 | 0 | 0 |
| Acrolein Cross-Linked Hydroxypropyl Starch of Example XVI | 0 | 0.5 | 5 |

* Cleargel starch is a commercial cross-linked waxy corn pie starch.

The above shows the improved freeze-thaw properties of the cross-linked starch acylates of this invention.

While the preceding examples show that the cross-linked cereal starch acylates of this invention have improved paste characteristics when the cross-linked starch has a two gram alkaline fluidity in the range of 50 cc. to 90 cc., we have found that each of the preferred cross-linking agents has its own most advantageous alkaline fluidity range and percent acyl by dry weight of the starch range. Normally we prefer to cross-link cereal starches having from 2–3.5% acyl by weight to an alkaline fluidity of from about 55 cc. to 75 cc. with acrolein, from about 55 cc. to 75 cc. with epichlorohydrin and from about 68 cc. to 85 cc. with phosphorous oxychloride in order to get products having the most advantageous paste properties. When acetaldehyde is used as an auxiliary cross-linker, it is usually preferable to have an alkaline fluidity of from about 77 cc. to 85 cc.

Since many embodiments of this invention may be made and since many changes may be made in the embodiments described, the foregoing is to be interpreted as illustrative only and our invention is defined by the claims appended hereafter.

We claim:

1. The process of preparing a cereal starch thickening agent, which comprises treating a quantity of cereal starch in suspension with a polyfunctional cross-linking agent selected from the group consisting of polyfunctional etherifying agents and polyfunctional esterifying agents to react with the hydroxyl groups of the cereal starch until the cross-linked starch has an alkaline fluidity of from about 50 cc. to 90 cc., acylating said quantity of cereal starch with a vinyl ester of an aliphatic monocarboxylic acid having from 1–18 carbon atoms, and maintaining said cereal starch in granular form.

2. The process of preparing a cereal starch thickening agent, which comprises treating a quantity of cereal starch in suspension with a polyfunctional cross-linking agent selected from the group consisting of polyfunctional esterifying agents and polyfunctional etherifying agents to react with the hydroxyl groups of the cereal starch, acylating said quantity of cereal starch with a vinyl ester of an aliphatic monocarboxylic acid having from 1–18 carbon atoms at an alkaline pH, whereby acetaldehyde is generated in situ, adjusting the pH of the reaction mixture containing free acetaldehyde below 4 and maintaining the pH of the reaction mixture below 4 to cause said acetaldehyde to react with the starch, and then separating a granular cross-ilnked cereal starch acylate having an alkaline fluidity of from about 60 cc. to 90 cc. from the reaction mixture.

3. The process of preparing a cereal starch thickening agent, which comprises treating cereal starch in suspension with a polyfunctional cross-linking agent selected from the group consisting of polyfunctional cross-linking etherifying agents and polyfunctional cross-linking esterifying agents to react with the hydroxyl groups of the cereal starch until the cross-linked cereal starch has an alkaline fluidity of from about 50 cc. to 90 cc., acylating said cross-linked starch with a vinyl ester of an aliphatic monocarboxylic acid having from 1 to 18 carbon atoms, and then separating a granular cross-linked starch acylate having an alkaline fluidity of from about 50 cc. to 90 cc. from the reaction mixture.

4. The process of claim 3 wherein the polyfunctional cross-linking agent is phosphorous oxychloride.

5. The process of claim 3 wherein the polyfunctional cross-linking agent is acrolein.

6. The process of claim 3 wherein the polyfunctional cross-linking agent is epichlorohydrin.

7. The process of claim 3 wherein the vinyl ester is vinyl acetate.

8. The process of claim 3 wherein the vinyl ester is vinyl propionate.

9. The process of preparing a cereal starch thickening agent, which comprises treating cereal starch in suspension with a polyfunctional cross-linking agent selected from the group consisting of polyfunctional etherifying agents and polyfunctional esterifying agents to react with the hydroxyl groups of the cereal starch until the cross-linked starch has an alkaline fluidity of from about 40 cc. to 60 cc., acylating said cross-linked starch with a vinyl ester of an aliphatic monocarboxylic acid having from 1 to 18 carbons atoms at an alkaline pH, whereby acetaldehyde is generated in situ, adjusting the pH of the reaction mixture to below 4, whereby the acylation reaction is terminated, maintaining the pH below 4 to cause said acetaldehyde to react with the starch until the cross-linked starch acylate has an alkaline fluidity of from about 60 cc. to 90 cc. and then separating the granular cross-linked cereal starch acylate from the reaction mixture.

10. The process of preparing a cereal starch thickening agent, which comprises acylating cereal starch in suspension with a vinyl ester of an aliphatic monocarboxylic acid having from 1 to 18 carbon atoms, treating said cereal starch acylate with a polyfunctional cross-linking agent selected from the group consisting of polyfunctional etherifying agents and polyfunctional esterifying agents to react with the hydroxyl groups of the cereal starch and separating a granular cereal starch acylate having an alkaline fluidity of from 50 cc. to 90 cc. from the reaction mixture.

11. A granular cross-linked cereal starch acylate of an aliphatic monocarboxylic acid having from 2 to 3 carbon atoms and having an alkaline fluidity of from about 50 cc. to 90 cc., a CIV viscosity at pH 3.5 of at least 700 gm.-cm. after 15 minutes and a CIV viscosity at pH 3.5 of at least 600 gm.-cm. after 40 minutes, said cereal starch acylate having from 1.5 to 3.5% by weight acylate groups and being cross-linked through the hydroxyl groups of the starch with a cross-linking agent selected from the group consisting of polyfunctional etherifying agents and polyfunctional cross-linking esterifying agents.

12. The product of claim 11 where the polyfunctional cross-linking agent is acrolein.

13. The product of claim 11 where the polyfunctional cross-linking agent is phosphorous oxychloride.

14. The product of claim 11 where the polyfunctional cross-linking agent is epichlorohydrin.

15. A granular cross-linked cereal starch acylate of an aliphatic monocarboxylic acid having from 2 to 3 carbon atoms and having an alkaline fluidity of from about 50 cc. to 90 cc., a CIV viscosity at pH 3.5 of at least 700 gm.-cm. after 15 minutes and a CIV viscosity at pH 3.5 of at least 600 gm.-cm. after 40 minutes, said cereal starch acylate having from 1.5 to 3.5% by weight acylate groups and being cross-linked through the hydroxyl groups of the starch with acetaldehyde and a polyfunctional cross-linking agent selected from the group consisting of polyfunctional etherifying agents and polyfunctional cross-linking esterifying agents.

16. A granular cross-linked cereal starch acetate having an alkaline fluidity of from about 60 cc. to 90 cc., a CIV viscosity at pH 3.5 of at least 700 gm.-cm. after 15 minutes and a CIV viscosity at pH 3.5 of at least 600 gm.-cm. after 40 minutes, said cereal starch acetate having from 1.5 to 3.5% by weight acetate groups and being cross-linked through the hydroxyl groups of the starch with a polyfunctional cross-linking agent selected from the group consisting of polyfunctional cross-linking etherifying agents and polyfunctional esterifying agents.

References Cited by the Examiner

UNITED STATES PATENTS

| | | | |
|---|---|---|---|
| Re. 23,443 | 12/1951 | Lolkema | 260—233.3 |
| 2,588,463 | 3/1952 | Balassa | 260—233.3 |
| 2,732,309 | 1/1956 | Kerr | 260—233.5 XR |
| 2,853,484 | 9/1958 | Lolkema et al. | 260—233.3 |
| 2,935,510 | 5/1960 | Wurzburg | 260—233.3 |

OTHER REFERENCES

Kerr, Ralph W.: Chemistry and Industry of Starch, Academic Press Inc., New York (1950) (page 471, lines 1-3).

WILLIAM H. SHORT, *Primary Examiner.*

A. H. WINKELSTEIN, *Examiner.*